US012129989B2

(12) United States Patent
Lin

(10) Patent No.: US 12,129,989 B2
(45) Date of Patent: Oct. 29, 2024

(54) LIGHT SUPPLYING DEVICE

(71) Applicant: Huazhi Zhao, Guangdong (CN)

(72) Inventor: Haiqun Lin, Guangdong (CN)

(73) Assignee: Huazhi Zhao, Shenzhen (CN)

( * ) Notice: Subject to any disclaimer, the term of this patent is extended or adjusted under 35 U.S.C. 154(b) by 0 days.

(21) Appl. No.: 18/409,914

(22) Filed: Jan. 11, 2024

(65) Prior Publication Data

US 2024/0142091 A1 May 2, 2024

(30) Foreign Application Priority Data

Oct. 16, 2023 (CN) ......................... 202311341639.1

(51) Int. Cl.

| | |
|---|---|
| ***F21V 15/01*** | (2006.01) |
| ***F21V 7/04*** | (2006.01) |
| ***F21V 23/04*** | (2006.01) |
| ***F21V 23/06*** | (2006.01) |
| ***F21Y 105/18*** | (2016.01) |
| ***F21Y 113/00*** | (2016.01) |
| ***F21Y 113/13*** | (2016.01) |

(52) U.S. Cl.

CPC ................ *F21V 15/01* (2013.01); *F21V 7/04* (2013.01); *F21V 23/0442* (2013.01); *F21V 23/06* (2013.01); *F21Y 2105/18* (2016.08); *F21Y 2113/13* (2016.08); *F21Y 2113/30* (2023.05)

(58) Field of Classification Search

CPC ........ F21V 15/01; F21V 7/04; F21V 23/0442; F21V 23/06; F21V 33/008; F21Y 2105/18; F21Y 2113/13; F21Y 2113/30; A63B 6/00; A63H 33/22

See application file for complete search history.

(56) References Cited

U.S. PATENT DOCUMENTS

| | | | | |
|---|---|---|---|---|
| 5,482,510 A * | 1/1996 | Ishii | A63G 31/16 | 472/61 |
| 5,830,034 A * | 11/1998 | Ciechanowski | A63H 33/22 | 362/186 |
| 8,403,517 B1 * | 3/2013 | Cox | A63B 43/06 | 206/315.9 |
| 10,898,763 B2 * | 1/2021 | Osborn | F21K 2/06 | |
| 11,933,576 B1 * | 3/2024 | Pineda | F41B 11/71 | |

FOREIGN PATENT DOCUMENTS

| | | | |
|---|---|---|---|
| CN | 201462596 U | 5/2010 | |
| CN | 208253346 U | 12/2018 | |
| WO | WO 2020118272 * | 6/2020 | A63B 57/20 |

* cited by examiner

*Primary Examiner* — Peggy A Neils

(74) *Attorney, Agent, or Firm* — SHIMOKAJI IP

(57) ABSTRACT

A light supplying device includes a box and a light emitting device. The box is provided with a cavity and configured to be fully closed or semi-closed, and the light emitting device is arranged in the box and configured to provide ultraviolet light and/or visible light. The device supplies light to a light receiving device such as luminous sporting goods to excite the fluorescent agent on the surface to produce fluorescence effect and shows luminous effect at night or in the dark. In such a way, the light receiving device such as the luminous sporting goods may receive the light anytime and anywhere, without sunlight irradiation, thereby improving the user's experience. Moreover, the device is convenient and portable, and has simple structure and high efficiency.

13 Claims, 12 Drawing Sheets

LIGHT SUPPLYING DEVICE

FIELD OF THE INVENTION

The invention relates to the technical field of luminous sporting goods, and particularly to a light supplying device for the luminous sporting goods.

BACKGROUND OF THE INVENTION

With the rapid development of society, people's needs and quality of life are constantly improving. In order to meet the needs of the modern society, it's required to be constantly progressive and innovative. More and more people are keen on luminous sporting goods, such as luminous Frisbee, luminous ping-pong, and luminous badminton and so on. These luminous sporting goods can not only provide more fun and special experience, but also attract more people to participate in it, thereby promoting the popularity of sports and fitness.

Luminous sporting goods commonly refer to those sporting goods attached or coated with phosphors on the surface thereof. The phosphors after absorbing sunlight will be slowly released in a fluorescent way, namely fluorescence radiation. In such a way, the sporting goods are luminous in the dark. However, this type of luminous sporting goods has obvious limitations under certain environmental conditions. For example, the fluorescence effect of the luminous sporting goods is greatly reduced in rainy or cloudy days due to the lack of sufficient sunlight irradiation. Therefore, the usage of the luminous sporting goods is limited due to the limited weather and environments.

Some luminous sporting goods are built-in power and light sources to produce luminous effect, which requires changing the inherent configuration and weight of the sporting goods. For example, a luminous Frisbee added with a battery-driven light source requires changing the preset weight, the shape of the Frisbee and its counterweight balance, which significantly increases the cost of the product and affects the reliability.

SUMMARY OF THE INVENTION

To meet the above requirements, the present invention provides a light supplying device, which supplies light to a light receiving device such as luminous sporting goods to excite the fluorescent agent on a surface thereof to produce fluorescence effect and shows luminous effect at night or in the dark. In such a way, the light receiving device such as the luminous sporting goods may receive the light anytime and anywhere, without sunlight irradiation, thereby improving the user's experience. Moreover, the light supplying device is convenient and portable, and has simple structure and high efficiency to shorten the waiting time.

To achieve the above purpose, the present invention discloses a light supplying device including a box and a light emitting device. The box is provided with a cavity and configured to be fully closed or semi-closed, and the light emitting device is arranged in the box and configured to provide ultraviolet light and/or visible light.

In comparison with the prior art, when the light supplying device of the present invention is used, the box is opened first, one or more luminous sporting goods are placed in the box, and then the box is closed (fully closed or semi-closed), and the light emitting device emits ultraviolet light and/or visible light on the luminous sporting goods, so that the phosphor contained in the luminous sporting goods is excited to produce the visible light effect. By this token, the luminous sporting goods may be irradiated so as to excite the fluorescence anytime and anywhere according to actual needs, without considering fluorescence excitation failure on rainy or cloudy days, which provides a good visual experience for the user. Further, the luminous light supplying device is portable and convenient to use.

As a preferable embodiment, a wavelength of the ultraviolet light is in a range of 10-400 nm, and a wavelength of the visible light is in a range of 400-700 nm.

As a preferable embodiment, the box includes a body part with the cavity and a box cover for sealing the body part.

As a preferable embodiment, the light emitting device includes a light emitting module and a mounting base for installing the light emitting module, and the mounting base is connected with the box.

As a preferable embodiment, the light emitting module includes lamp beads and a lamp panel for installing the lamp beads, the mounting base is provided with a plurality of through holes, the lamp panel is located between the box and the mounting base, and the lamp beads are installed in the through holes.

As a preferable embodiment, light emitted from the lamp beads is configured to irradiate a light receiving surface of an external light receiving device directly or by means of a mirror reflector.

As a preferable embodiment, the box cover has an accommodating space in which the mounting base is arranged.

As a preferable embodiment, the light emitting device further includes a power supply for supplying power to the light emitting module.

As a preferable embodiment, a charging interface is arranged on the box for charging the power supply.

As a preferable embodiment, a control circuit board and a switch are connected with the control circuit board, wherein the control circuit board is connected with the light emitting module for controlling irradiation time of the light emitting module.

As a preferable embodiment, a sensor is connected with the control circuit board for sensing a status of the box, wherein when the box is sensed as unclosed, the control circuit board controls to not start the light emitting module.

As a preferable embodiment, a connecting part is arranged between the body part and the box cover, the connecting part includes a first mounting hole arranged in the body part, a second mounting hole arranged in the box cover, a connecting shaft and an elastic part, one end of the connecting shaft is extended into the first mounting hole, and the other end of the connecting shaft is extended into the second mounting hole, and the elastic part is mounted on the connecting shaft to cause the box cover to be always closed towards the body part.

As a preferable embodiment, the box is provided with a button, the button includes an operating part, a connecting plate and a spring, the connecting plate is detachably connected in the cavity of the body part, the body part is provided with a through slot for installing the operating part, the spring is located between the operating part and the connecting plate, the operating part is provided with a locking groove, the box cover is provided with a locking part matched with the locking groove, and the spring is always locked between the locking groove and the locking part.

As a preferable embodiment, the box is provided with a lug and a hanging slot provided on the lug for connecting an external connecting member.

As a preferable embodiment, a lens is arranged between the light emitting module and an external light receiving device.

BRIEF DESCRIPTION OF THE DRAWINGS

The accompanying drawings facilitate an understanding of the various embodiments of this invention. In such drawings.

REFERENCE NUMERALS

Figure 1:
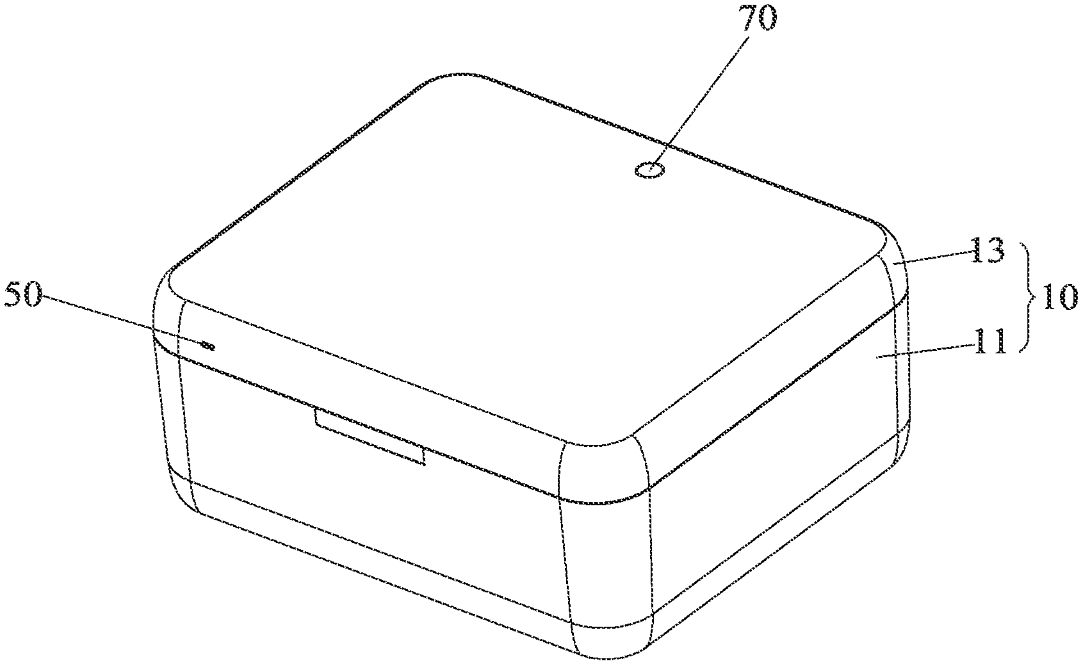
FIG. 1 is a perspective view of the light supplying device according to one embedment of the present invention.

Box 10, body part 11, cavity 111, through slot 115, engaging slot 113, box cover 13, protruding part 131, luminous sporting goods 20, light emitting device 30, light emitting module 31, lamp bead 311, lamp panel 313, mounting base 33, power supply 35, charging interface 50, control circuit board 60, switch 70, lens 80, connecting part 90, first mounting hole 91, second mounting hole 92, connecting shaft 93, elastic part 94, button 100, operating part 101, connecting plate 102, spring 103, locking groove 105, indicator 110, lug 130, slot 133.

DETAILED DESCRIPTION OF ILLUSTRATED EMBODIMENTS

The following is a clear and complete description of the technical solution according to the embodiments of the present invention in combination with the drawings. Obviously, the embodiments described are only a part of the embodiments of the present invention, but not the all embodiments. Based on the embodiments of the present invention, all other embodiments obtained by person ordinarily skilled in the art without making creative works fall within the scope of protection of the present invention.

Figure 2:
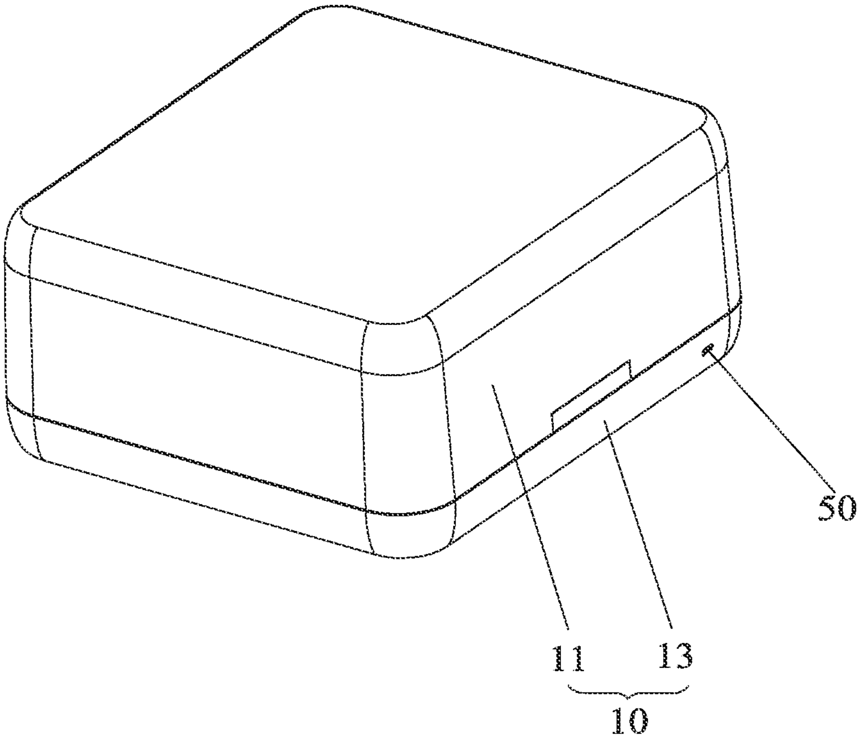
FIG. 2 is another perspective view of the light supplying device shown in FIG. 1.
Figure 3:
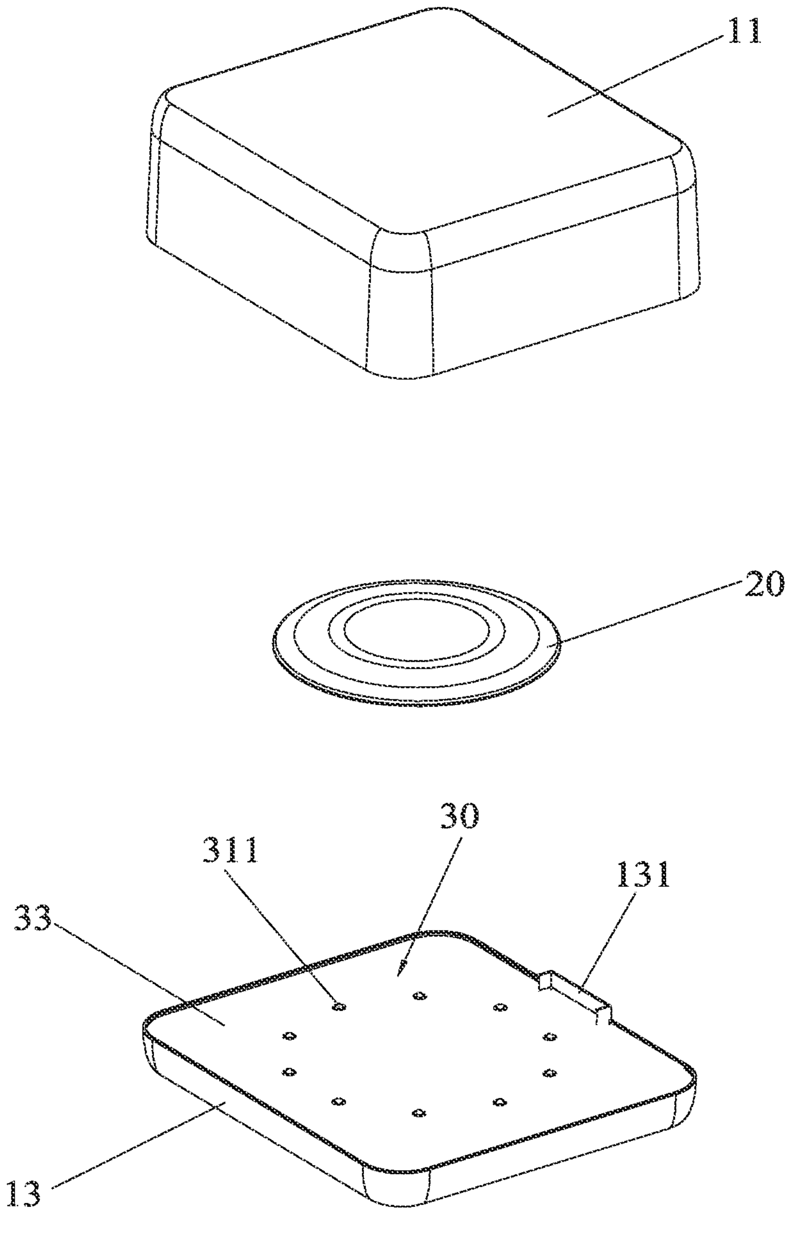
FIG. 3 is a partial exploded view of the light supplying device shown in FIG. 2.

Referring to FIGS. 1-3, a light supplying device provided in the present invention is suitable for providing light to an external light receiving device such as one or more luminous sporting goods 20 coated with phosphor or fluorescent agent in the present invention. The light supplying device includes a box 10 and a light emitting device 30. The box 10 is provided with a cavity and can be fully closed or semi-closed. The light emitting device 30 is arranged in the box 10 and used to provide ultraviolet (UV) light and/or visible light.

In the above technical solution, when the luminous light supplying device is used to provide light to the luminous sporting goods 20, the box 10 is opened first, the luminous sporting goods 20 is placed in the box 10, and then the box 10 is closed (fully closed or semi-closed), and the light emitting device 30 emits UV light and/or visible light on the luminous sporting goods 20, so that the phosphor contained in the luminous sporting goods 20 is excited to produce the visible light effect. By this token, the luminous sporting goods 20 may be irradiated so as to excite the fluorescence anytime and anywhere according to actual needs, without considering fluorescence excitation failure on rainy or cloudy days, which provides a good visual experience for the user. Further, the luminous light supplying device is portable and convenient to use.

It is understood that the light emitting device 30 of the present invention may provide at least one of the UV light and the visible light, and different light sources may be adopted according to different kinds of light. Further, the wavelength of the UV light is in a range of 10-400 nm, and the wavelength of visible light is in a range of 400-700 nm. Preferably, the wavelength of the UV light is between 300-400 nm, and the wavelength of visible light is in a range of 400-500 nm. Further, the wavelength of the UV light is 365 nm, and the wavelength of the visible light is between 400-450 nm. In the present embodiment, the light emitting device 30 provides an UV light with a wavelength of 365 nm.

Figure 4:
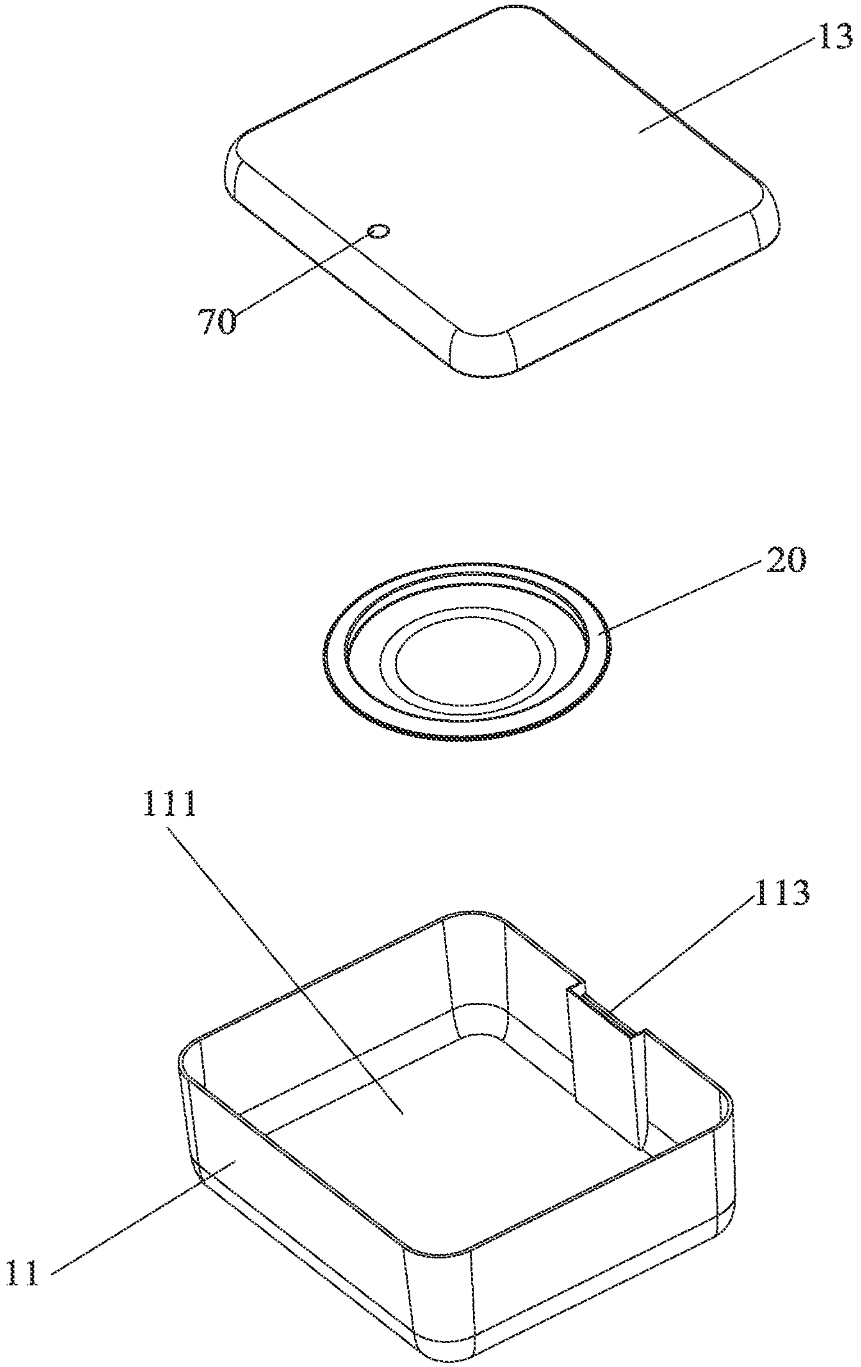
FIG. 4 is a partial exploded view of the light supplying device shown in FIG. 1.
Figure 8:
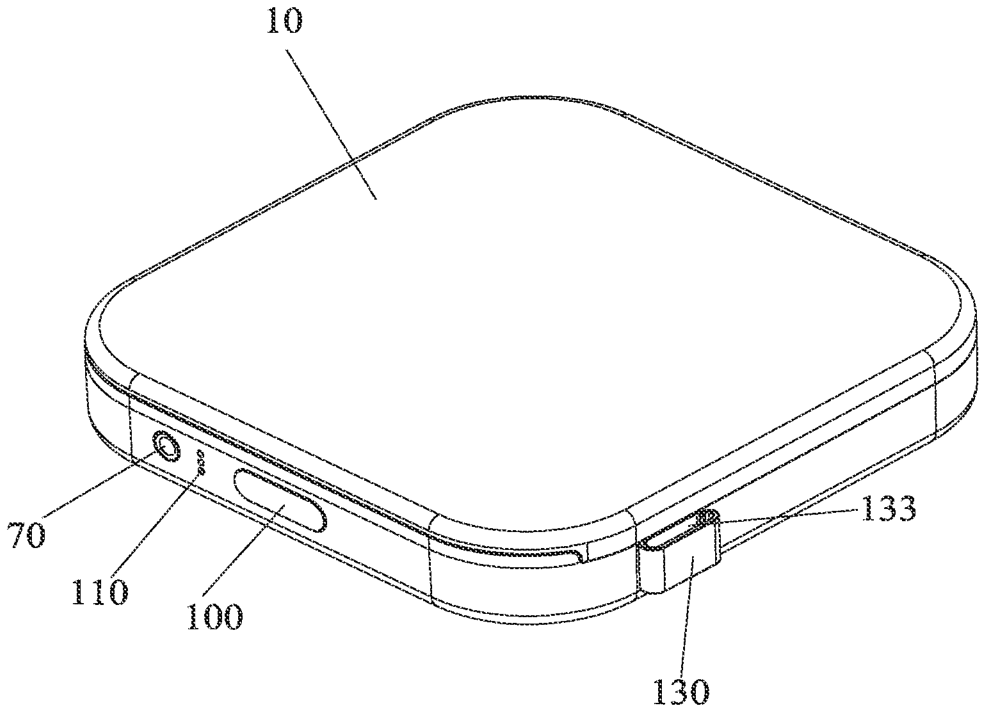
FIG. 8 is a perspective view of the light supplying device according to another embedment of the present invention.
Figure 9:
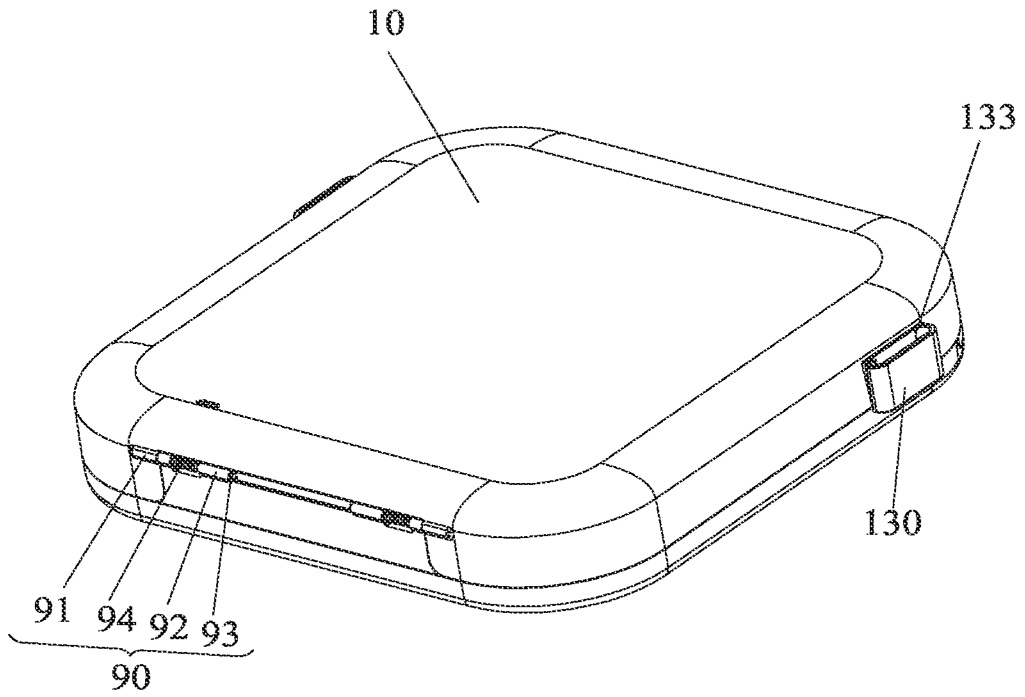
FIG. 9 is another perspective view of the light supplying device shown in FIG. 8.
Figure 10:
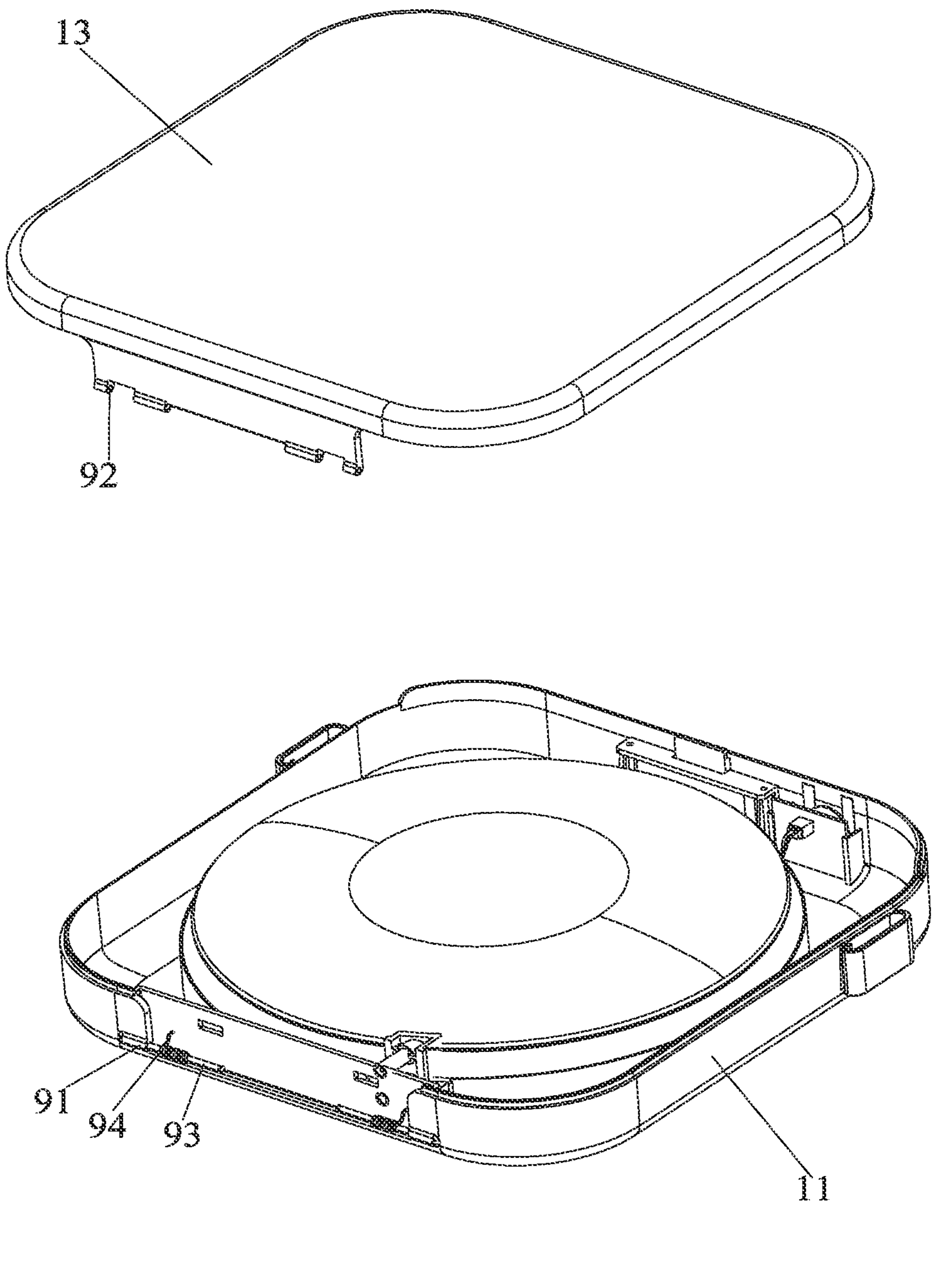
FIG. 10 is an exploded view of the body part and the box cover of the light supplying device according to one embedment of the present invention.

Referring to FIGS. 3 and 4, the box 10 includes body part 11 with a cavity 111 and a box cover 13 matched with body part 11 for sealing the body part 11. Specifically, by the box cover 13, the body part 11 may be fully sealed to achieve full closure, or semi-sealed to achieve semi-closure. In this embodiment, the body part 11 is fully sealed with the box cover 13. For example, the shape of the box 10 may be cylindrical, quadrilateral, square, rectangular, cone, triangle, trapezoid or irregular shape. In the present embodiment, the structure of the box 10 is quadrilateral. The body part 11 has a cavity 111 with an upper opening, and the box cover 13 may be sealed at the upper opening of the body part 11. Further, the body part 11 is rotationally connected with one end of the box cover 13, that is to say, the box cover 13 can rotate around a rotating shaft relative to the body part 11. Optionally, the body part 11 may be pivotally connected or hinged with the box cover 13, which is not limited however. Referring to FIGS. 8-10, in a preferred embodiment, a connecting part 90 is arranged between body part 11 and the box cover 13, and the connecting part 90 includes a first mounting hole 91 arranged in the body part 11, a second mounting hole 92 arranged in the box cover 13, a connecting shaft 93 and an elastic part 94. One end of the connecting shaft 93 is extended into the first mounting hole 91, and the other end of the connecting shaft 93 is extended into the second mounting hole 92. The elastic part 94 is installed on the connecting shaft 93, and the box cover 13 is always closed towards the body part 11 to improve the safety of the light receiving device. In this embodiment, two connecting parts 90 are arranged between the body part 11 and the box cover 13 to improve the stability of the connection.

Referring to FIGS. 3-4, in a preferred embodiment, the body part 11 is engaged with another end of the box cover

Figure 12:
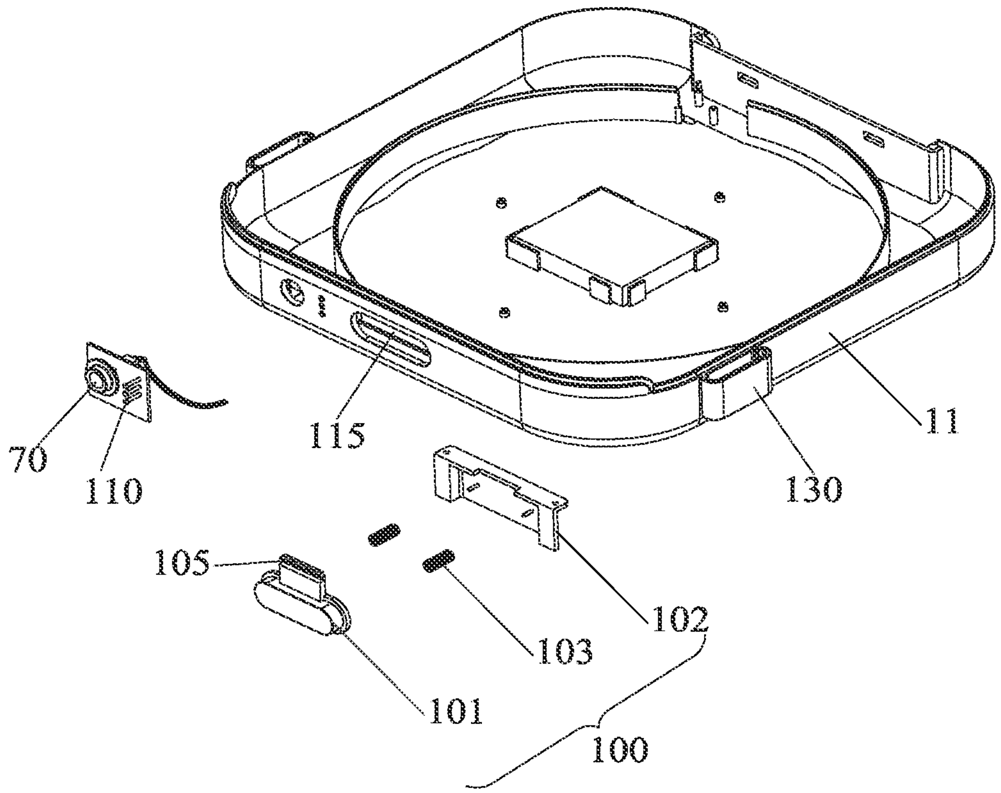
FIG. 12 is a partial exploded view of the light supplying device shown in FIG. 8.

13. As an example, the box cover 13 is provided with a protruding part 131, and the body part 11 is provided with an engaging slot 113 for engaging with the protruding part 131. When the protruding part 131 is locked in the engaging slot 113, the box cover 13 cannot be rotated, removed or lifted from the body part 11 to avoid unexpected opening of the box cover 13. Conversely, when the protruding part 131 is unlocked with the engaging slot 113, the box cover 13 can be rotated, removed or lifted from the body part 11. Further, the box 10 may be provided with a button to control the locking and unlocking of the protruding part 131 and the engaging slot 113 for easy operation. In addition to the common opening and closing manner, the box 10 may be configured in a drawer-like way, in an electric storage and push-pull way or in a shape like a pot. For example, as a pot-shaped box, when used, the light receiving device is inverted inside the box. In a preferred embodiment, referring to FIGS. 8 and 12, the box 10 is provided with a button 100 including an operating part 101, a connecting plate 102 and a spring 103. The connecting plate 102 is detachably connected in the cavity 111 of the body part 11, which is provided with a through slot 115 for installing the operating part 101. The spring 103 is located between the operating part 101 and the connecting plate 102. The top of the operating part 101 is extended with a locking groove 105, and the box cover 13 is provided with a locking part (not shown in the figure) that is matched with the locking groove 105. The spring 103 always locks the locking groove 105 and the locking part. When the operating part 101 is pressed to overcome the elastic force of the spring 103, the locking groove 105 and the locking part are unlocked.

Referring to FIGS. 8-9, the box 10 is further provided with a lug 130, and the lug 130 includes a slot 133 for connecting a connecting member, such as a rope, a belt, etc. By means of the connecting member connecting with the slot 133, the light supplying device is portable.

Figure 5:
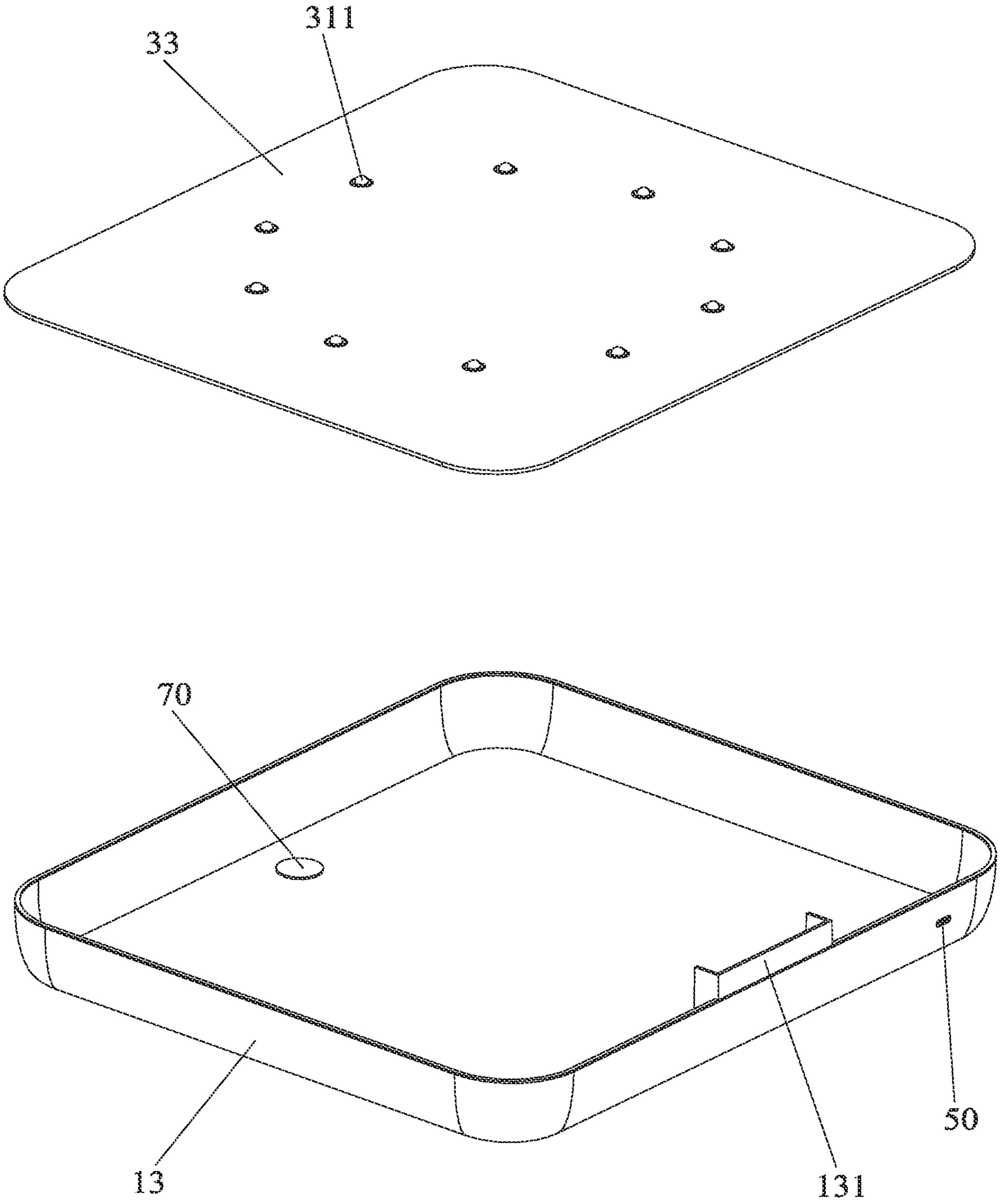
FIG. 5 is an exploded view of the light emitting module and the box cover of the light supplying device according to one embedment of the present invention.
Figure 6:
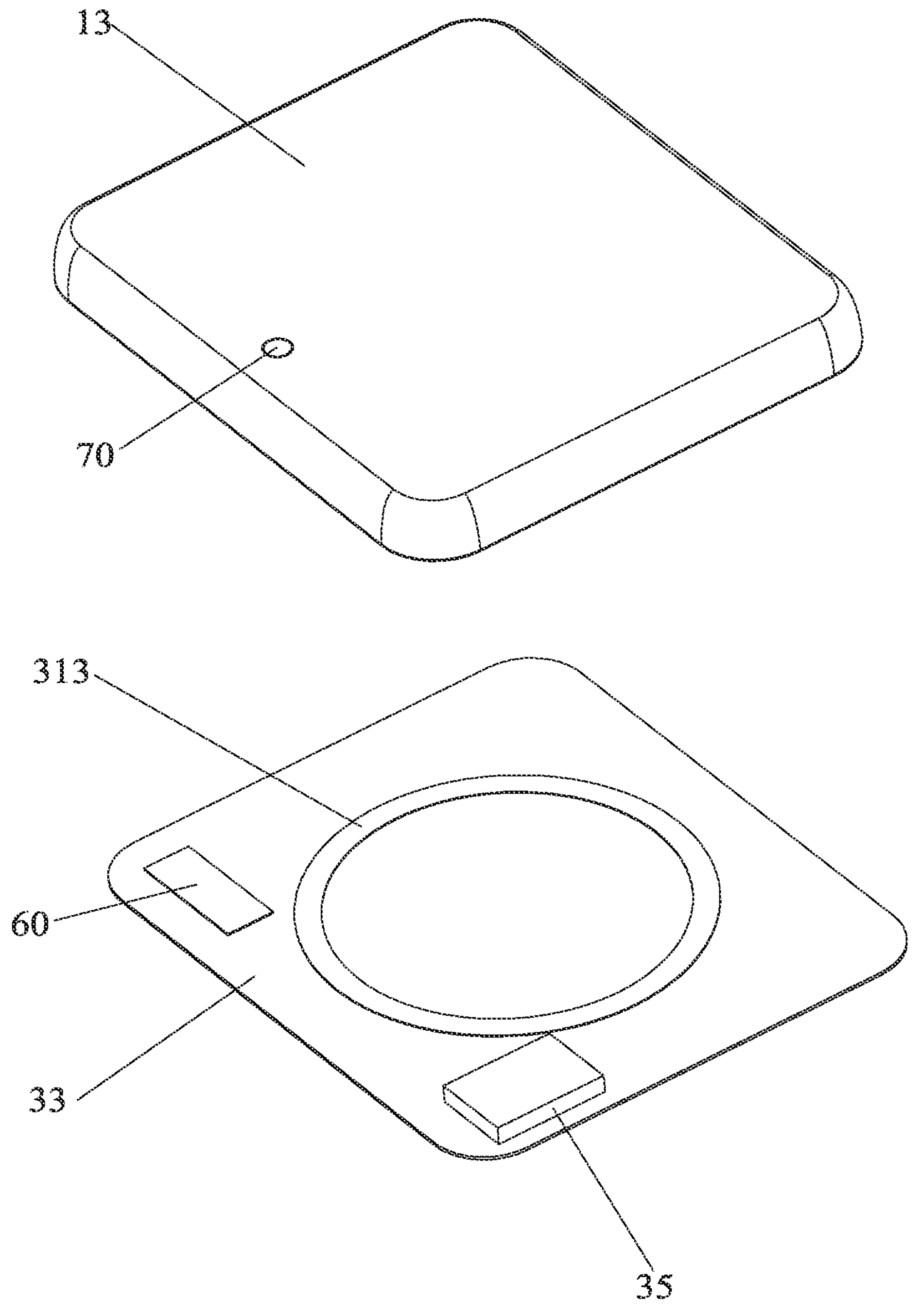
FIG. 6 is another exploded view of the light emitting module and the box cover of the light supplying device according to one embedment of the present invention.
Figure 7:
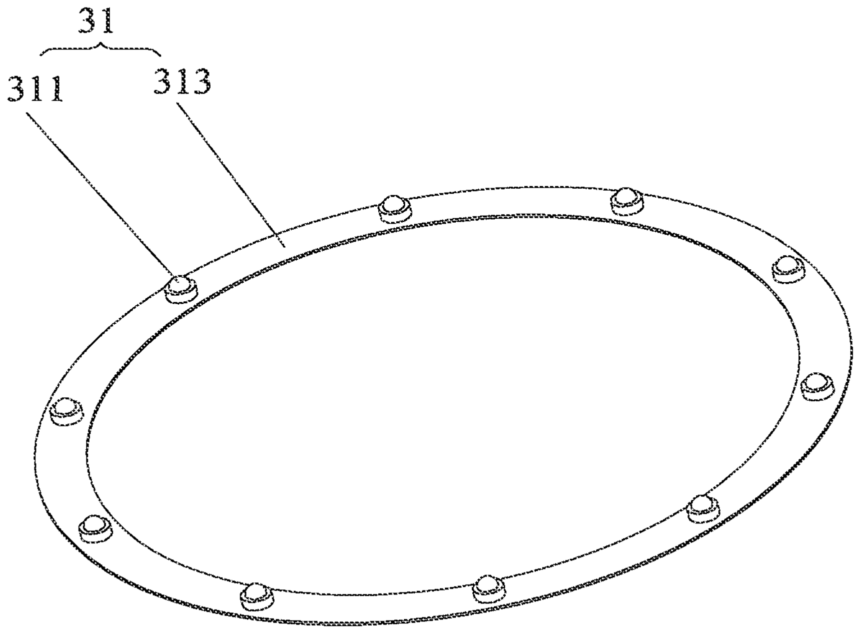
FIG. 7 is a perspective view of the light emitting module in the light supplying device according to one embedment of the present invention.
Figure 11:
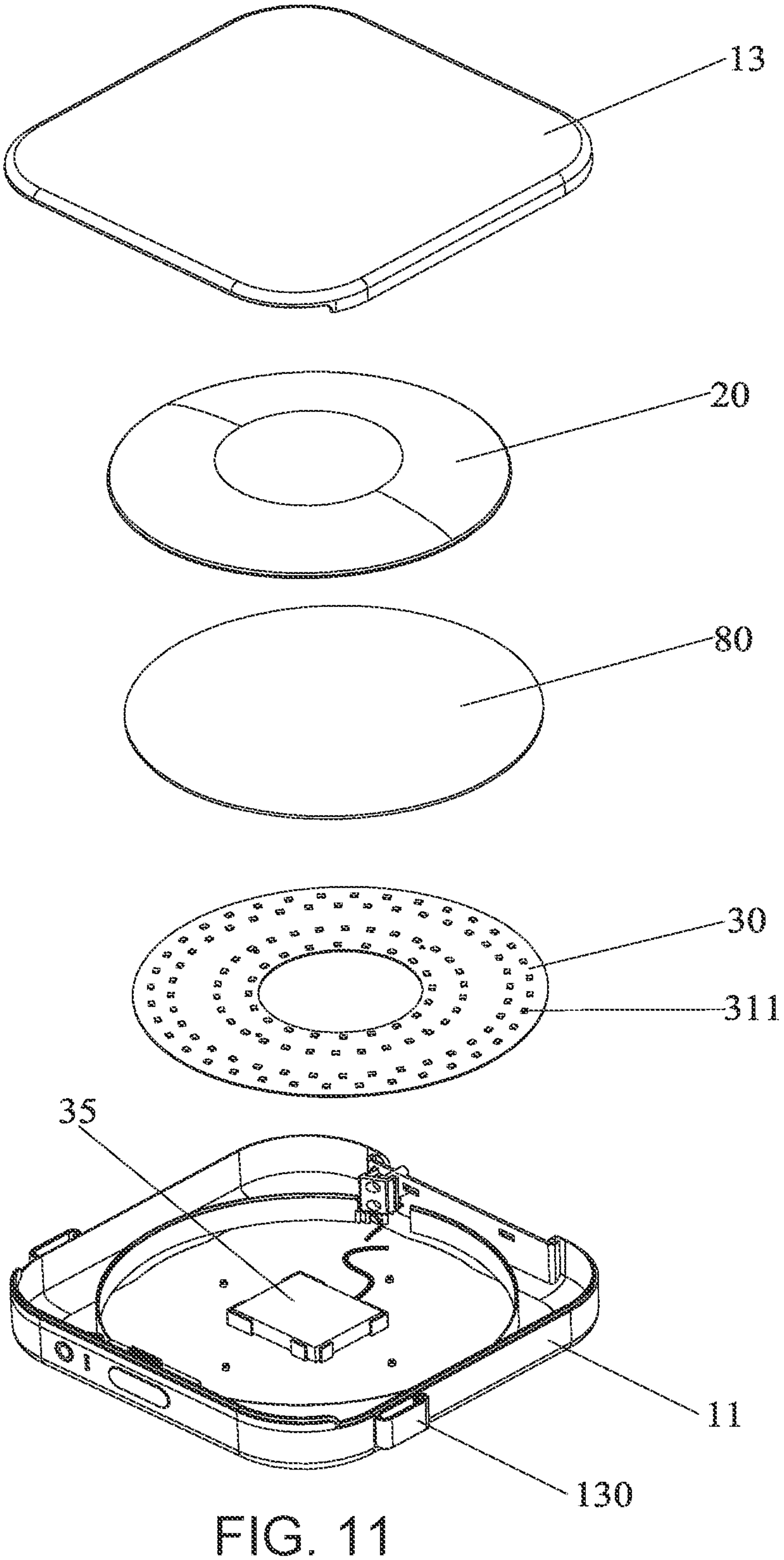
FIG. 11 is an exploded view of the light supplying device shown in FIG. 8.

Referring to FIGS. 5-7, the light emitting device 30 includes a light emitting module 31 and a mounting base 33 for installing the light emitting module 31. The mounting base 33 is connected with the box 10, and the light emitting module 31 is fixed in the box 10 by the mounting base 33. In such a way, the installation efficiency is improved and the installation stability is ensured. Understandably, the light emitting module 31 may be arranged at the bottom of the box 10 by means of the mounting base 33, or arranged on the top of the box 10. Optionally, the light emitting module 31 may be arranged at the side wall of the box 10, or one light emitting module 31 may be arranged on each or at least two of the top, the bottom and the side wall of the box 10. That is to say, multiple light emitting modules 31 may be configured to achieve uniform irradiation on the light receiving device. Preferably, a mirror reflector may be utilized to further improve the irradiation uniformity of the light source. In the present embodiment, the light emitting module 31 is arranged at the top of the box 10 through the mounting base 33. In particular, the box cover 13 has an accommodating space in which the mounting base 33 is arranged. One or more luminous sporting goods 20 (including but not limited to luminous Frisbee, luminous ping-pong, luminous badminton, luminous sports clothing, etc.) are placed in the cavity 111 of the body part 11. After sealing the box cover 13, the light emitting module 31 in the box cover 13 provides UV light and/or visible light irradiation on the luminous sporting goods 20. In the present embodiment, the luminous sporting goods 20 are luminous Frisbees. It is also understood that the UV light and/or the visible light provided by the light emitting module 31 may be directly irradiated on the surface of the luminous sports goods, or indirectly irradiated on the surface of the luminous sporting goods 20, such as by means of a mirror reflector. In some embodiments, referring to FIG. 11, a lens 80 is arranged between the light emitting device 30 and the luminous sporting goods 20, for focusing the light from the light emitting device 30 on the luminous sporting goods 20 to improve the efficiency of light use. Further, with the help of the lens 80, the direction of the light may be changed to irradiate on the desired position of the luminous sporting goods 20. In addition, the undesired light may be filtered by the lens 80, thereby allowing the light with specific wavelengths to reach the luminous sporting goods 20.

Referring to FIGS. 5-7, the light emitting module 31 includes lamp beads 311 and a lamp panel 313 for installing the lamp beads 311. The mounting base 33 is provided with a plurality of through holes, the lamp panel 313 is located between the box 10 and the mounting base 33, and the lamp beads 311 are installed in the through holes. In such a way, the shape of the lamp panel 313 may be configured based on the actual needs. In the present embodiment, the lamp panel 313 is a ring structure, and multiple such as ten lamp beads 311 are distributed in the ring structure of the light panel 313. The lamp beads 311 inserted into the through holes irradiates the luminous sporting goods 20 in the cavity 111. In some embodiments, the light generated by the lamp bead 311 may irradiate the surface of the light receiving device directly or with the help of a mirror reflector. As an example, the light emitted by the lamp beads 311 irradiates one side of the light receiving device and irradiates the rest sides with the help of the mirror reflector, so that the entire light receiving device is evenly irradiated. Further, the light emitting device 30 further includes a power supply 35 for supplying power to the light emitting module 31. Alternatively, an external power supply also may be used. Specifically, the power supply 35 may include a rechargeable battery which is connected to the lamp beads 311 for supplying power. Preferably, the power supply 35 is mounted on mounting base 33. For example, the power supply 35 is fixed on mounting base 33 and located between mounting base 33 and the box cover 13. Further, in order to facilitate the charging of the power supply 35, the light supplying device further includes a charging interface 50 arranged on the box 10 for charging the power supply 35. The charging interface 50 may include a Micro USB interface, a Type-c interface, and/or a Lightning interface, etc., which is not limited here.

Referring to FIG. 6, the light supplying device may further include a control circuit board 60 and a switch 70 connected to the control circuit board 60. The control circuit board 60 is connected to the light emitting device 30 for controlling the irradiation time of the light emitting device 30. That is to say, when the luminous sporting goods 20 is placed in the box 10, the control circuit board 60 controls the light emitting device 30 to emit UV light or visible light through the switch 70, and after the preset time, the light emitting device 30 stops working. It's understandable that the irradiation time of the light emitting device 30 may be preset in advance. Preferably, referring to FIG. 8, an indicator 110 is provided on the box 10, which provides different brightness or different colors to remind the user. As an example, the indicator 110 is on, indicating that the device is supplying the light to the product 20; and the indicator 110 is off, indicating that the light supplying is finished and reminding the user to take it out. As UV light is harmful to the human body, a sensor is further configured and connected with the control circuit board 60 for sensing a status of the box 10 in order to ensure the safety and reliability. When the box 10 is sensed as unclosed, the light emitting device 30 will not be operated. Specifically, when the box 10 is opened, which is sensed by the sensor, and then the sensor instructs the control circuit board 60 to turn off the light emitting device 30, so as to ensure the safety and reliability.

The above-mentioned embodiments only represent several embodiments of the present invention, and the descriptions thereof are relatively specific and detailed, but should not be construed as limiting the scope of the patent invention. It should be pointed out that for those skilled in the art, several modifications and improvements can be made without departing from the concept of the present invention, which all belong to the protection scope of the present invention. Therefore, the scope of protection of the patent of the present invention shall be subject to the appended claims.

What is claimed is:

1. A light supplying device, comprising a box and a light emitting device, wherein the box is provided with a cavity and configured to be fully closed or semi-closed, and the light emitting device is arranged in the box and configured to provide ultraviolet light and/or visible light;

wherein the box comprises a body part with the cavity and a box cover for sealing the body part, light emitting device comprises a light emitting module and a mounting base for installing the light emitting module, and the mounting base is connected with the box; the light emitting module comprises lamp beads and a lamp panel for installing the lamp beads, the mounting base is provided with a plurality of through holes, the lamp panel is located between the box and the mounting base, and the lamp beads are installed in the through holes.

2. The light supplying device according to claim 1, wherein a wavelength of the ultraviolet light is in a range of 10-400 nm, and a wavelength of the visible light is in a range of 400-700 nm.

3. The light supplying device according to claim 1, wherein light emitted from the lamp beads is configured to irradiate a light receiving surface of an external light receiving device directly or by means of a mirror reflector.

4. The light supplying device according to claim 1, wherein the box cover has an accommodating space in which the mounting base is arranged.

5. The light supplying device according to claim 1, wherein the light emitting device further comprises a power supply for supplying power to the light emitting module.

6. The light supplying device according to claim 5, further comprising a charging interface arranged on the box for charging the power supply.

7. The light supplying device according to claim 1, further comprising a control circuit board and a switch connected with the control circuit board, wherein the control circuit board is connected with the light emitting module for controlling irradiation time of the light emitting module.

8. The light supplying device according to claim 7, further comprising a sensor connected with the control circuit board for sensing a status of the box, wherein when the box is sensed as unclosed, the control circuit board controls to not start the light emitting module.

9. The light supplying device according to claim 1, wherein a connecting part is arranged between the body part and the box cover, the connecting part comprises a first mounting hole arranged in the body part, a second mounting hole arranged in the box cover, a connecting shaft and an elastic part, one end of the connecting shaft is extended into the first mounting hole, and the other end of the connecting shaft is extended into the second mounting hole, and the elastic part is mounted on the connecting shaft to cause the box cover to be always closed towards the body part.

10. The light supplying device according to claim 1, wherein the box is provided with a button, the button comprises an operating part, a connecting plate and a spring, the connecting plate is detachably connected in the cavity of the body part, the body part is provided with a through slot for installing the operating part, the spring is located between the operating part and the connecting plate, the operating part is provided with a locking groove, the box cover is provided with a locking part matched with the locking groove, and the spring is always locked between the locking groove and the locking part.

11. The light supplying device according to claim 1, wherein the box is provided with a lug and a hanging slot provided on the lug for connecting an external connecting member.

12. The light supplying device according to claim 1, further comprising a lens which is arranged between the light emitting module and an external light receiving device.

13. A light supplying device, comprising a box and a light emitting device, wherein the box is provided with a cavity and configured to be fully closed or semi-closed, and the light emitting device is arranged in the box and configured to provide ultraviolet light and/or visible light;

wherein the box comprises a body part with the cavity and a box cover for sealing the body part; the box is provided with a button, the button comprises an operating part, a connecting plate and a spring, the connecting plate is detachably connected in the cavity of the body part, the body part is provided with a through slot for installing the operating part, the spring is located between the operating part and the connecting plate, the operating part is provided with a locking groove, the box cover is provided with a locking part matched with the locking groove, and the spring is always locked between the locking groove and the locking part.

* * * * *